Sept. 29, 1931.  J. J. STOETZEL  1,825,618
PNEUMATIC DISPATCH CONTROL VALVE
Filed Sept. 19, 1929
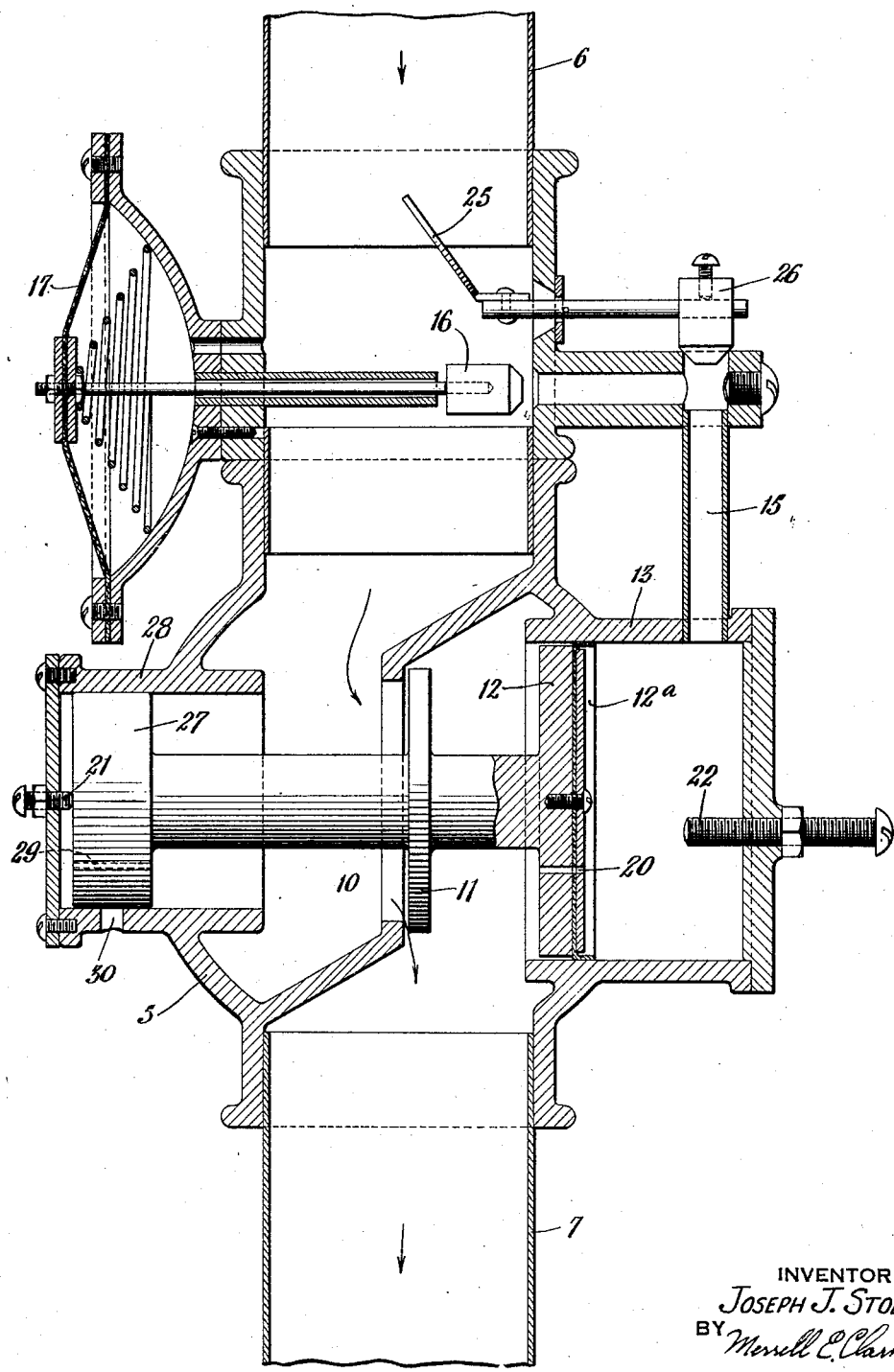
INVENTOR
Joseph J. Stoetzel
BY Merrell E. Clark
ATTORNEY Patented Sept. 29, 1931

1,825,618

UNITED STATES PATENT OFFICE

JOSEPH JOHN STOETZEL, OF QUEENS VILLAGE, NEW YORK, ASSIGNOR TO G & G ATLAS SYSTEMS, INC., OF NEW YORK, N. Y., A CORPORATION OF NEW YORK

PNEUMATIC DISPATCH CONTROL VALVE

Application filed September 19, 1929. Serial No. 393,604.

The present invention relates to pneumatic dispatch tube systems and has for an object to provide an improved air controlling and regulating device for a system of the minimum flow type.

It is desirable so to control the air flowing in the pneumatic tube line that when there is no carrier in the line a minimum flow of air will be maintained and when the line is loaded with one or more carriers an operative air current will be induced.

The present invention provides an improved arrangement comprising a valve which will be maintained in substantially closed condition when the line is entirely open but will automatically open when the line is obstructed by a carrier inserted therein, the arrangement being such that the valve is opened by movement in the direction of flow of the air.

The mechanism is of such character as to be very sensitive and to permit adjustment for a relatively small minimum flow.

The nature and objects of the invention will be better understood from a description of a particular embodiment of the invention for the purpose of which description reference should be had to the accompanying drawing forming a part hereof and in which—

The figure is a central sectional view of a control mechanism embodying the invention.

The structure shown for the purposes of illustrating the invention comprises a control valve for a minimum flow pneumatic dispatch system designed to permit, when the valve is substantially closed, a minimum flow of air and, when the valve is open, to permit a carrier driving flow. As usual in control mechanisms of this type the arrangement is such that when a carrier is inserted in the line, the reduction of pressure in the line due to the suction will cause an opening of the control valve to cause a carrier driving flow of air and when the last carrier in the line is delivered and the line is free the valve will be again automatically closed.

Referring particularly to the structure shown in the drawing, the valve casing 5, arranged to be connected to a dispatch tube line 6 and a suction line 7 as is usual in control valves of the type, has a central port 10 closed by a valve member 11 which moves in the direction of the flow of air to open the port and in opposition to the flow of air to close it. The valve member is shown as freely floating in the casing as distinguished from a valve member which is spring pressed in either direction. Its position is controlled by a piston 12 operating in a cylinder 13 and suitably connected to the valve member and shown as integral therewith. The cylinder 13 is in communication on one side of the piston with the valve casing beyond the port 10, i. e. on the suction side thereof, and on the other side of the piston with the valve casing on the inlet side or, what amounts to the same thing, in communication with the dispatch line 6 through a passage 15. This communication to the dispatch line is normally open when there is no carrier in the line, but may be closed by a valve 16 under control of the pneumatic 17 which is responsive to a diminution of pressure in the dispatch line. Accordingly when the pressure in the dispatch line is decreased, as when a carrier is inserted in the line, the valve 16 will close and pressure in the cylinder 13 beyond the piston 12 will be diminished through a by-pass 20 in the piston to equalize the pressure on the two sides of the piston. When this occurs the valve member 11 will be moved to open position by the difference of pressures existing on opposite faces of this valve. The movement of the valve member is limited by a stop screw 21 which determines its closed position and permits adjustment for minimum flow and by a stop screw 22 which determines its maximum open position.

The closing of the valve when the line ceases to be obstructed by a carrier therein is accomplished by means of a vane 25 in the dispatch line connected to a valve 26 which controls the admission of atmospheric air to the cylinder 13 beyond the piston 12. This vane is operated by the increased flow of air in the dispatch line as is usual in devices of this type.

In the particular apparatus illustrated the valve member is connected to a second piston 27 which operates in a cylinder 28 in communication on the inner side of the piston with the interior of the valve casing and in the particular structure shown this communication is on the inlet side of the valve port. The piston 27 in the cylinder 28 may serve two functions in the structure shown. It may serve as a dash pot to prevent too abrupt closing of the valve member 11, the piston being provided with a restricted aperture or by-pass 29, if desired, for this purpose and it may aid in opening the valve, provision being made for admitting atmospheric pressure to the cylinder beyond the piston when the valve member is open to a certain predetermined extent. As shown a vent 30 is provided in the cylinder spaced sufficiently from one end thereof so as not to interfere with the dash pot action while nevertheless permitting atmospheric air to enter the cylinder when the piston moves beyond a predetermined point during the opening of the valve. By this arrangement the pressure of the atmosphere on the piston 27 will aid in holding the valve member in fully opened position at proper times in the operation of the apparatus. The diameter of the piston 12 is preferably made larger than the diameter of the valve member 11 or the port 10 and larger than the diameter of the piston 27. It has been found, for example that effective operation can be obtained with an apparatus in which the diameter of the piston 12 is two and one-half inches, the diameter of the piston 27 one and three-quarter inches and of the valve member 11 two and one-eighth inches.

The piston 12 may be provided with a washer 12a to prevent excessive leakage. Ordinarily it will not be necessary to similarly provide the piston 27 with a packing for a reasonable leakage past this piston will not be objectionable.

The foregoing particular description is illustrative merely and is not intended as defining the limits of the invention.

I claim:

1. A control valve for a minimum flow pneumatic dispatch system comprising a valve casing having a main port, a freely floating valve member closing said port and opening in the direction of flow through the port, and means responsive to conditions in the line for controlling said valve.

2. A control valve for a minimum flow pneumatic dispatch system comprising a valve casing having a port, a valve member closing said port, a cylinder, a piston in said cylinder operatively connected to said valve and subject on one side to the air pressure of the valve casing, means including a valve responsive to a diminution of pressure in the carrier line to cause a decrease of air pressure in said cylinder and means responsive to an increase of air flow in the line to admit air to said cylinder.

3. A control valve for a minimum flow pneumatic dispatch system comprising a valve casing having a port, a valve member movable in opposition to the flow of air to close said port, a cylinder, a piston in said cylinder operatively connected to said valve and subject on one side to the air pressure of the valve casing, a restricted by-pass through said piston, an auxiliary valve controlling the admission of air to the cylinder on the second side of the piston, means responsive to a diminution of pressure in the line for closing the auxiliary valve whereby the pressure on the opposite sides of the piston may be equalized through the by-pass, and means responsive to an increase of air flow in the line to admit air to the cylinder to move the valve to closed position.

4. A control valve for a minimum flow pneumatic dispatch system comprising a valve casing having a port, a valve member closing said port, a cylinder, a piston therein operatively connected to said valve, said cylinder being in communication on one side of the piston with the interior of the valve casing beyond the valve port, and in communication on the other side of the piston with the pneumatic dispatch line, pressure in the dispatch line when admitted to the cylinder tending to hold the valve member in closed position, a by-pass through said piston, and means responsive to a diminution of pressure in the dispatch line for closing the communication to the dispatch line.

5. A control valve for a minimum flow pneumatic dispatch system comprising a valve casing having a port, a valve member closing said port, a cylinder, a piston therein operatively connected to said valve, said cylinder being in communication on one side of the piston with the interior of the valve casing beyond the valve port, and in communication on the other side of the piston with the pneumatic dispatch line, pressure in the dispatch line when admitted to the cylinder tending to hold the valve member in closed position, a by-pass through said piston, means responsive to a diminution of pressure in the dispatch line for closing the communication to the dispatch line, and means responsive to flow of air in the line for admitting air to the cylinder for moving the valve member to closed position.

6. A control valve for a minimum flow pneumatic dispatch system comprising a valve casing having a port, a valve member movable in opposition to the flow of air to close said port, a cylinder in communication with the interior of the valve casing, a piston in said cylinder operatively connected to said valve member, a restricted by-pass through said piston, an auxiliary valve controlling the admission of air to said cylinder, means responsive to a diminution of pressure in the carrier line to close said auxiliary valve and means responsive to an increase of air flow in the line to admit air to the cylinder.

7. A control valve for a minimum flow pneumatic dispatch system comprising a valve casing adapted to be connected between the dispatch line and the suction line and having a port, a valve member closing said port, a piston normally controlled by the difference in pressure between the dispatch line and the suction line to hold the valve member in closed position, but operative upon diminution of pressure in the dispatch line to permit the valve to open by movement in the direction of air flow, substantially as described.

8. A control valve for a minimum flow pneumatic dispatch system comprising a valve casing adapted to be connected between the dispatch line and the suction line and having a port, a valve member movable in opposition to the flow of air to close said port, a piston normally controlled by the difference in pressure between the dispatch line and the suction line connected to the valve member and operative to hold it in closed position, and means responsive to the insertion of a carrier in the line to equalize the air pressure on opposite sides of the piston, substantially as described.

9. A control valve for a minimum flow pneumatic dispatch system comprising a valve casing adapted to be connected between the dispatch line and the suction line and having a port, a valve member movable in opposition to the flow of air to close said port, a piston normally controlled by the difference in pressure between the dispatch line and the suction line connected to the valve member and operative to hold it in closed position, means responsive to the insertion of a carrier in the line to equalize the air pressure on opposite sides of the piston, a second piston of smaller area than the first mentioned piston also connected to the valve member, said second piston being subject on one side to the pressure within the system and when the valve member is in open position being subject on the other side to atmospheric pressure, substantially as described.

10. A control valve for a minimum flow pneumatic dispatch system comprising a valve casing adapted to be connected between the dispatch line and the suction line and having a port, a valve member movable in opposition to the flow of air to close said port, a piston of larger area than the area of the port connected to said valve member, said piston being subject on one side to the pressure in the suction line and on the other side to the pressure of the dispatch line, the latter pressure tending to close the valve member, substantially as described.

11. A control valve for a minimum flow pneumatic dispatch system comprising a valve casing adapted to be connected between the dispatch line and the suction line and having a port, a valve member closing said port, a piston normally controlled by the suction in the suction line to hold the valve member in closed position, but operative upon diminution of pressure in the dispatch line to permit the valve to open by movement in the direction of air flow, substantially as described.

12. A control valve for a minimum flow pneumatic dispatch system comprising a valve casing having a central port adapted to be connected to a pneumatic dispatch line on the inlet side and a suction line on the outlet side, said casing having larger and smaller cylinders coaxial with said valve port, the smaller cylinder being in communication with the interior valve casing on the inlet side of the valve port, the larger cylinder being in communication with the interior of the valve casing on the outlet side of the valve port, a valve member comprising a closure for said port and pistons operative in said cylinders, the larger piston having a restricted by-pass therethrough, a communicating passage for admitting air from the inlet side of the valve casing to the larger cylinder beyond the piston for creating a pressure tending to hold the valve member in closed position, and a valve responsive to a diminution of pressure in the dispatch line for closing said passage whereby pressure within the cylinder may be reduced by exhaust of air through the by-pass.

13. A control valve for a minimum flow pneumatic dispatch system comprising a valve casing having a central port adapted to be connected to a pneumatic dispatch line on the inlet side and a suction line on the outlet side, said casing having larger and smaller cylinders coaxial with said valve port, the smaller cylinder being in communication with the interior valve casing on the inlet side of the valve port, the larger cylinder being in communication with the interior of the valve casing on the outlet side of the valve port, a valve member comprising a closure for said port and pistons operative in said cylinders, the larger piston having a restricted by-pass therethrough, a communicating passage for admitting air from the inlet side of the valve casing to the larger cylinder beyond the piston for creating a pressure tending to hold the valve member in closed position, a valve responsive to a diminution of pressure in the dispatch line for closing said passage whereby pressure within the cylinder may be reduced by exhaust of air through the by-pass, and means responsive to a flow of air in the dispatch line for admitting air to the larger cylinder to move the valve member to closed position.

14. A control valve for a minimum flow pneumatic dispatch system comprising a valve casing having a central port adapted to be connected to a pneumatic dispatch line on the inlet side and a suction line on the outlet side, said casing having larger and smaller cylinders coaxial with said valve port, the smaller cylinder being in communication with the interior valve casing on the inlet side of the valve port and having a vent to admit air beyond the piston when the valve member has moved a predetermined distance toward its open position, the larger cylinder being in communication with the interior of the valve casing on the outlet side of the valve port, a valve member comprising a closure for said port and pistons operative in said cylinders, the larger piston having a restricted by-pass therethrough, a communicating passage for admitting air from the inlet side of the valve casing to the larger cylinder beyond the piston for creating a pressure tending to hold the valve member in closed position, and a valve responsive to a diminution of pressure in the dispatch line for closing said passage whereby pressure within the cylinder may be reduced by exhaust of air through the by-pass.

15. A control valve for a minimum flow pneumatic dispatch system comprising a valve casing having a port, a valve member closing said port and opening in the direction of flow through said port, a cylinder, a piston in said cylinder operatively connected to said valve and subject on one side to the air pressure of the valve casing, said piston having an opening therethrough communicating with said valve casing whereby the pressure in said cylinder may be decreased in response to a diminution of pressure in the carrier line, and means responsive to an increase in air flow in the line to increase the pressure in said cylinder.

In testimony whereof, I have signed my name to this specification this 11 day of September, 1929.

JOSEPH JOHN STOETZEL.